United States Patent [19]
Stanchus et al.

[11] Patent Number: 5,774,755
[45] Date of Patent: Jun. 30, 1998

[54] CAMERA AND METHOD FOR TRANSPORTING FILM IN A CAMERA

[75] Inventors: Robert J. Stanchus; Timothy J. Fuss, both of Rochester, N.Y.

[73] Assignee: Eastman Kodak Company, Rochester, N.Y.

[21] Appl. No.: 874,841

[22] Filed: Jun. 13, 1997

[51] Int. Cl.$^6$ .................................................. G03B 17/24
[52] U.S. Cl. .......................................... 396/411; 396/538
[58] Field of Search .................................... 396/411, 415, 396/535, 538

[56]  References Cited

U.S. PATENT DOCUMENTS

| | | |
|---|---|---|
| 1,921,559 | 8/1933 | Case . |
| 2,140,445 | 12/1938 | Mihalyi . |
| 2,168,998 | 8/1939 | Lindenberg . |
| 2,674,931 | 4/1954 | Mihalyi . |
| 2,704,969 | 8/1955 | Mische . |
| 2,912,181 | 11/1959 | Suzukawa . |
| 3,097,809 | 7/1963 | Gunther . |
| 3,399,843 | 9/1968 | Nerwin . |
| 3,423,041 | 1/1969 | Steisslinger . |
| 3,479,940 | 11/1969 | Nerwin . |
| 3,868,710 | 2/1975 | VanOsch . |
| 4,548,304 | 10/1985 | Nagata . |
| 5,189,453 | 2/1993 | Boyd . |
| 5,568,214 | 10/1996 | Stiehler . |

*Primary Examiner*—David M. Gray
*Attorney, Agent, or Firm*—Robert Luke Walker

[57]  ABSTRACT

A camera for use with a thrust type cartridge having a spool and a photographic filmstrip and method for transporting film in a camera. The camera has a body that defines cartridge and supply chambers and an exposure frame between the chambers. A spindle is disposed in the cartridge chamber to engage the cartridge spool. A supply spool is disposed in the supply chamber and is rotatable about an axis. A cincher is disposed in the supply chamber to cinch the filmstrip to the spool. A film drive is in engagement with the supply spool and the spindle to rotate the supply spool and spindle in opposed advance and rewind directions. A film winder is mounted to the body and is pivotable in first and second opposite directions relative to the body through an arc of less than a full circle. A ratchet and pawl mechanism connects the film winder to the film drive. The ratchet and pawl mechanism is mechanically engaged with the film drive in the first direction of pivoting of the film winder relative to the film drive. The ratchet and pawl mechanism is mechanically disengaged from the film drive in a second direction of pivoting. A crank is mounted to the body and is rotatable, relative to the body, through a full circle in forward and reverse directions of rotation. The crank is engageable with the film drive in both directions of rotation.

17 Claims, 8 Drawing Sheets

5,774,755

CAMERA AND METHOD FOR TRANSPORTING FILM IN A CAMERA

CROSS REFERENCE TO RELATED APPLICATIONS

Reference is made to commonly assigned co-pending U.S. patent application Ser. No., entitled: CAMERA AND ADVANCE-REWIND UNIT, and filed in the name of Patricia Williams.

FIELD OF THE INVENTION

The invention relates to still photographic film cameras and to film transport methods for cameras. The invention more particularly relates to a camera and method for transporting film in a camera.

BACKGROUND OF THE INVENTION

In many still photographic film cameras, film is loaded as a scroll within a canister or magazine. The film is advanced from one chamber to another within the camera and is later rewound back into the magazine. Film exposure is provided either on film advance or on rewind. The commonest film of this type has been 135 format (also called "35 mm"). A newer film of this general type is Advanced Photo System™ format film (APS™ film) such as Advantix™ films marketed by Eastman Kodak Company, of Rochester, N.Y.

Unlike 135 film magazines, APS film magazines do not rely on an external leader for film loading. The APS magazine is instead dropped into the camera and the film leader is thrust out of the magazine and over to a take-up spool. The leader is engaged by the spool and the film is then wound out of the magazine, and later rewound, in a conventional manner. The thrusting and initial winding of the APS film leader requires a number of rotations of the film spools and the parts of the film transport mechanism. It is highly desirable to minimize the burden this could present to an APS camera user, since it detracts from the otherwise quick and easy film loading provided by APS film.

One solution is to motorize film transport in the APS camera. This solution is very practical for higher priced APS cameras, since it renders the thrusting and initial winding of the film leader hardly noticeable to the user; however, the motor can add an unacceptable cost to a lower priced camera.

Another solution is require the user to manually prewind the entire roll of film out of the magazine before exposing the film. The thrusting and initial winding of the film leader is a small fraction of the total prewinding time and effort. This approach is practical; but, for many people, contrary to past experience using non-motorized cameras. This presents a risk that persons would fail to prewind or would rewind previously exposed film. The risk could be reduced with appropriate mechanical interlocks designed to only permit operation of the camera in a prescribed manner; however, such interlocks add to complexity and cost and a risk remains that the user will force the camera to behave in an expected, but inappropriate manner.

It is thus desirable that a camera provide quick and easy thrusting and initial winding of a film leader using a film transport mechanism in which film is advanced on a frame-by-frame basis and rewound after exposure. It is further desirable that the camera provide for easy film advance during use.

Many 135 cameras have a film advance lever or thumb wheel that can move film from one frame to the next, with one or two small motions of a thumb or finger.

U.S. Pat. No. 1,921,559 discloses a camera in which a knob attached to a spool in a film magazine is turned one direction to thrust film into an empty chamber and is turned in another direction to rewind the film into the magazine. U.S. Pat. No. 3,868,710 discloses a similar camera in which both the film magazine and the supply chamber lack spools.

U.S. Pat. No. 2,674,931 discloses a camera in which a knob connected to a film spool is moved to one axial position to prewind a roll of film into an empty chamber. The shaft is then moved to another axial position to engage a one-way clutch that, in association with a metering mechanism, only permits the knob to turn in the opposite direction, winding the film.

U.S. Pat. No. 2,704,969 discloses a camera in which an objective/range finder knob is coaxial with a film winding knob. The objective/range finder knob pivots about an arc within a fixed mount concentric with the larger film winding knob.

U.S. Pat. No. 3,423,041 discloses a camera in which a single operating lever (moved in one direction of rotation) advances and rewinds film. A two position drive mechanism is switched to change the direction of rotation.

U.S. Pat. No. 3,399,843 discloses a camera in which a shaft is movable between a first position engaging a take-up spool for winding film from a magazine and a second position engaging a gear train connected to the magazine spool for rewinding back into the magazine. The same knob is used in both cases. Engagement and disengagement of the take-up spool is provided by a positive clutch. Engagement and disengagement of the gear train is provided by movement of a gear fixed to the shaft. A ratchet and pawl mechanism limits movement of the shaft to a single direction of rotation. U.S. Pat. No. 3,479,940 discloses a similar camera providing automatic film advancing and rewinding.

U.S. Pat. No. 2,140,445 discloses a camera having film advance and rewinding clutches, which are connected to respective film spools and separate film winding and rewinding mechanisms, alternately by a pivoting lever. The rewinding mechanism has a knob that rotates in axial alignment with one of the film spools. The film winding mechanism has a film advance lever which rotates about an axis disposed at 90 degrees to the axes of film chambers.

U.S. Pat. No. 5,568,214 discloses a camera having a clutch between a take-up spool and a drive gear.

U.S. Pat. No. 2,168,998 discloses a camera having a film-winding mechanism including a ratchet and pawl. A winding knob is rotated to advance the film. The pawl can be moved out of engagement with the ratchet for rewinding using a separate rewinding knob. U.S. Pat. No. 1,317,034 and Great Britain Patent No. 499,544 also disclose cameras having film winding mechanisms having ratchets and pawls.

U.S. Pat. No. 4,522,477 discloses a camera having a motorized winder/rewinder having separate coaxial one-way clutches for film advancing and rewinding. A manual wind lever is also coaxial and includes an additional one-way clutch.

U.S. Pat. No. 4,548,304 discloses a one-way over-running clutch and a camera having a pair of such clutches, arranged to operate in opposite directions of rotation, for film advancing and rewinding using a reversible motor.

SUMMARY OF THE INVENTION

The invention is defined by the claims. The invention, in its broader aspects, provides a camera for use with a thrust type cartridge having a spool and a photographic filmstrip and method for transporting film in a camera. The camera has a body that defines cartridge and supply chambers and an exposure frame between the chambers. A spindle is disposed in the cartridge chamber to engage the cartridge spool. A supply spool is disposed in the supply chamber and is rotatable about an axis. A cincher is disposed in the supply chamber to cinch the filmstrip to the spool. A film drive is in engagement with the supply spool and the spindle to rotate the supply spool and spindle in opposed advance and rewind directions. A film winder is mounted to the body and is pivotable in first and second opposite directions relative to the body through an arc of less than a full circle. A ratchet and pawl mechanism connects the film winder to the film drive. The ratchet and pawl mechanism is mechanically engaged with the film drive in the first direction of pivoting of the film winder relative to the film drive. The ratchet and pawl mechanism is mechanically disengaged from the film drive in a second direction of pivoting. A crank is mounted to the body and is rotatable, relative to the body, through a full circle in forward and reverse directions of rotation. The crank is engageable with the film drive in both directions of rotation.

It is an advantageous effect of the invention to provide a camera and method that provide quick and easy thrusting and initial winding of a film leader using a film transport mechanism in which film is advanced on a frame-by-frame basis and rewound after exposure. It is a further advantageous effect of the invention to provide a camera and method that provide for easy film advance during use.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

DESCRIPTION OF PARTICULAR EMBODIMENTS

Figure 1:
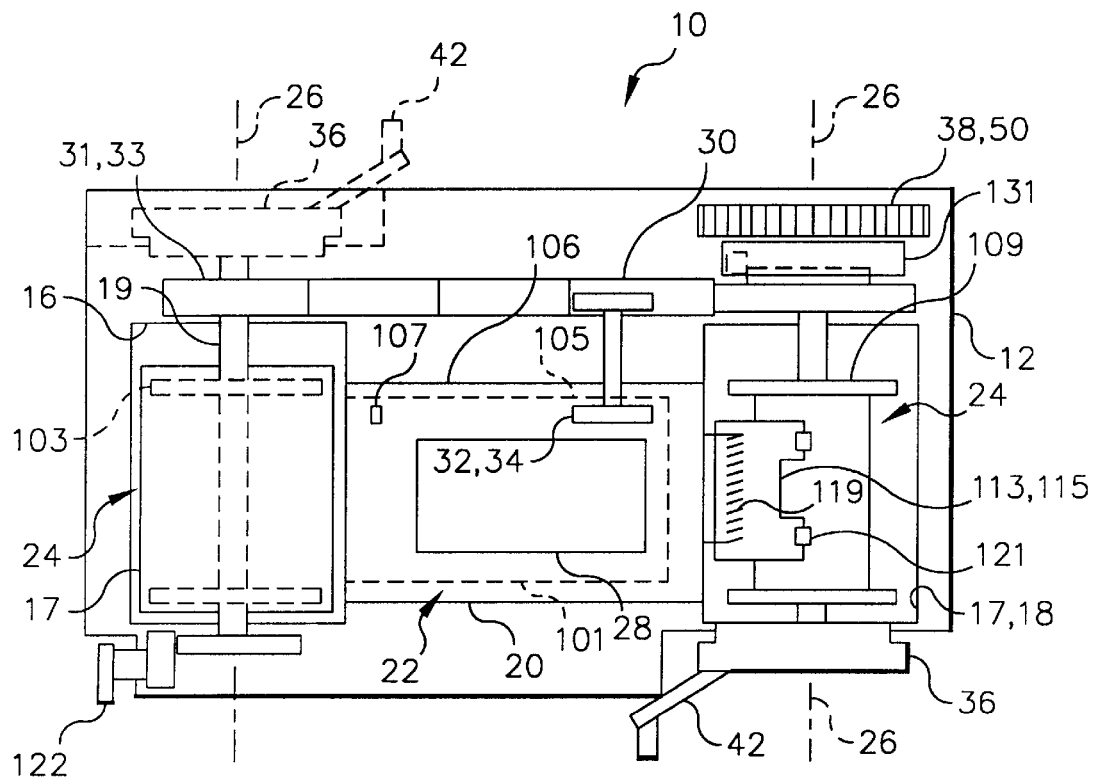
FIG. 1 is a semi-diagrammatical rear plan view of an embodiment of the camera of the invention. The location of the crank in another embodiment of the invention is indicated by dashed lines. For clarity, features are not all drawn to the same scale.
Figure 2:
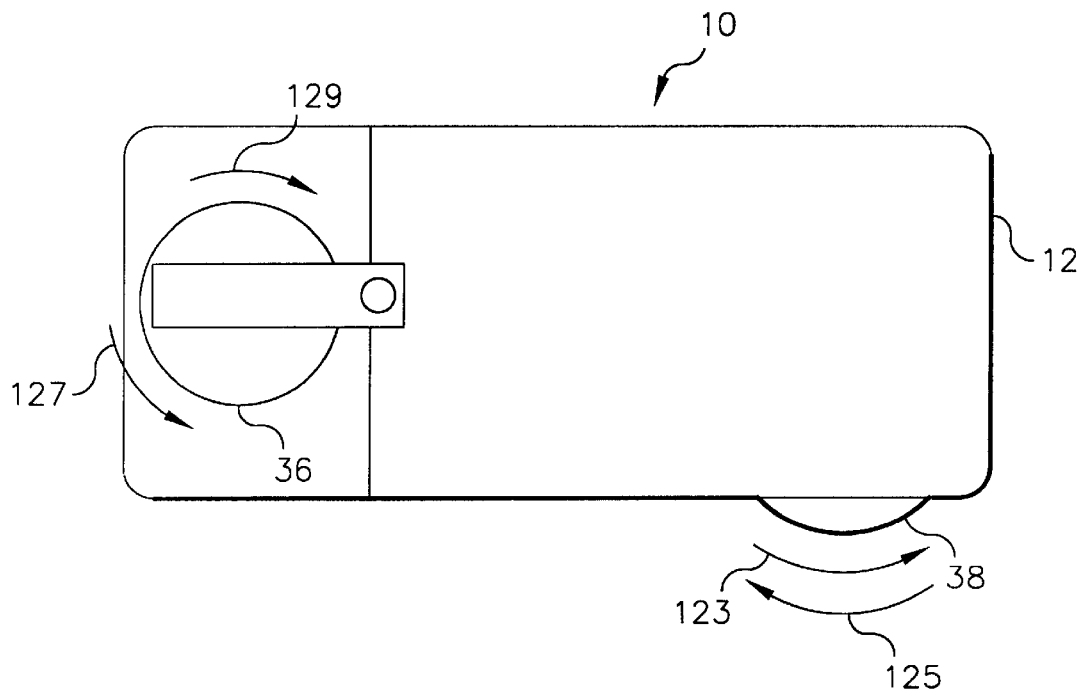
FIG. 2 is top plan view of the camera indicated partially by dashed lines in FIG. 1.

Referrring initially to FIGS. 1–2, the camera 10 of the invention includes a body 12. The body 12 defines and encloses a first film chamber or cartridge chamber 16 and a second film chamber or supply chamber or film accumulating chamber 18 and an exposure frame 20 in a light-tight manner. The exposure frame 20 is disposed between the chambers 16,18. The body 12 defines and encloses a film path 22 and a substantially cylindrical film space 24 within each of the chambers 16,18. The film spaces 24 each have an axis 26 aligned substantially parallel to the film path 22. A film exposure system 28 selectively directs light to film in the exposure frame 20.

The cartridge chamber 16 is adapted to receive a thrust type cartridge 17, preferably an APS™ cartridge. In APS cartridges 17, the filmstrip 101 is wound on an internal spool 103. The filmstrip 101 has a leading portion 105 that is not peforated that is followed by a main portion 106 that has sprocket holes 107. A supply spool 109 is disposed in the supply chamber 18. The supply spool 109 is rotatable about a supply spool axis that is coextensive with the film space axis 26. A cincher 113 disposed in the supply chamber 18 to cinch the leading portion 105 of the filmstrip 101 to the supply spool 109. With thrust type films like APS films, the entire filmstrip is returned to the cartridge after exposure. It is necessary to cinch the film to a take-up spool without crimping; since the crimped part will not easily return to the film canister after exposure. A variety of cinchers are known that are used to cinch the leading portion of the filmstrip to a take-up or supply spool without crimping. Such a cincher 113 is illustrated in simplified form in FIG. 1. The cincher 113 has a plate 115 that is pivotably mounted to supply chamber wall 117 and urged against the supply spool by a spring 119. A pair of rollers 121 bear against the filmstrip 101 and provide enough pressure to cinch the leading portion as the spool 109 rotates during initial film advancing.

As a matter of convenience, the term "advancing" and similar terms are used generally herein to refer to film movement in both regular winding and prewinding cameras, in a direction in which the main portion of the film is repeatedly moved one frame at a time for exposure purposes. The term "rewinding" and similar terms are used herein to refer to film movement in a direction in which the main portion of the film is transferred from one film chamber to another, without intervening exposures.

A film drive 30 is disposed in the body 12 in operative relation to the film path 22. Specific details of the film drive 30 can vary. A great many different film drives 30 are well known to those of skill in the art. For example, the film drive 30 can include a gear train or cogbelts and cogwheels, or a combination of such features. Film drives 30 commonly include one or more engagement elements 32 that coact with sprocket holes (not shown) of perforated film. Examples of such elements include rotating sprockets and linearly and/or pivotably movable pawl or sprag mechanisms. Film drives are illustrated in the figures. These illustrations are explanatory, not limiting, and include arrangements of features that are not optimized for particular uses.

The film drive is in engagement with the supply spool and the spindle and can rotate the supply spool and spindle in opposed advance and rewind directions of rotation. A spindle 19 engages the spool 21 of the cartridge 17. The spindle 19 is fixed to one of the gears 31 of a gear train 33 of the film drive 30. Another gear 31 is fixed to the supply spool 109 that is disposed in the supply chamber 18.

The film drive 30 includes an engagement-metering element 32 that provides a gear and an adjoining film sprocket on a common shaft. The engagement-metering element 32 is part of a metering mechanism that limits film advance to one frame per shutter actuation. The film drive 30 repeatedly meters the film during advancing to hold segments of film in position for exposure in the exposure frame 20. The film drive 30 meters against the perforations, in other words, the metering mechanism 34 includes an engagement-metering element 32 that grips the perforations to align an unexposed film segment with the exposure frame and restrict further movement until the film is exposed. With APS™ films, the leading portion of the film is not perforated and metering does not occur until sufficient film has been wound that the peforated main portion of the film has been reached. The metering mechanism is not limited to devices having an engagement-metering element meshed with a gear train. In many film drives 30 convenient for use in the camera 10 of the invention, the engagement-metering element is a sprocket that is not driven by a gear, but rather movement of the film itself.

The film drive 30 can include an anti-backup 122. The anti-backup 122 prevent rewinding the operator from inadvertently rewinding. The anti-backup 122 is changeable between an advance condition and a rewind condition. In the advance condition, the anti-backup precludes the film drive from rotating the supply spool and the spindle in the rewind direction of rotation. A variety of anti-backups are well-known to those of skill in the art. An example of a suitable anti-backup mechanism is the same kind of ratchet and pawl mechanism described in detail below in relation to other camera features.

The film drive 30 can include any of a wide variety of additional features (not shown) that add to the convenience of using the camera. The film drive can include a door lock that precludes access to the film magazine unless the film has been rewound into the magazine and, for example, with APS film, can include a member for opening the film door of the APS magazine. The camera of the invention is generally applicable to photographic films usable in the form of rolled filmstrips and is not limited to a particular photographic film format or type.

Figure 3:
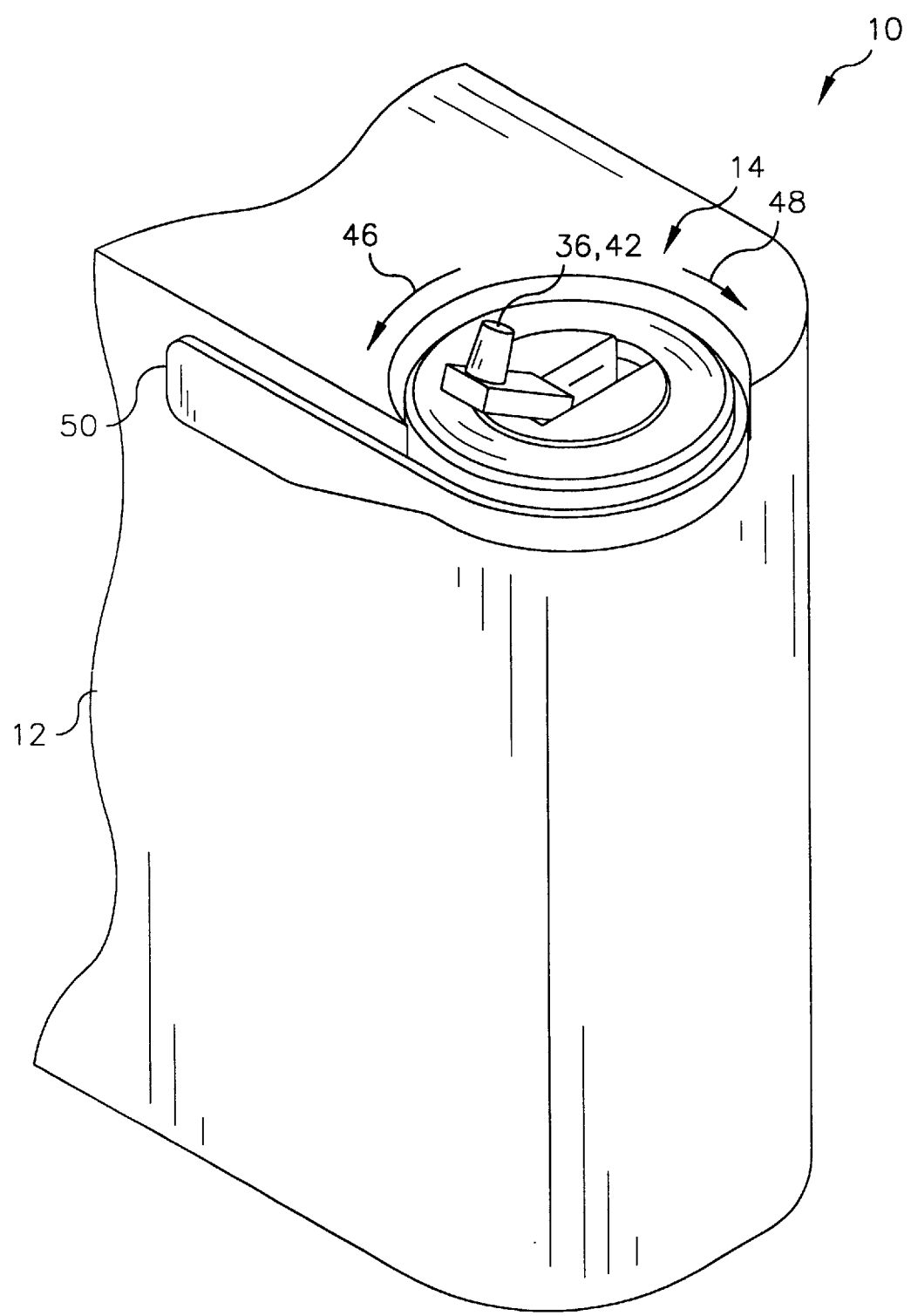
FIG. 3 is a rear partial perspective view of an embodiment of the camera of the invention. In this embodiment, the advance-rewind unit of the invention is horizontal and the film winder is an advance lever.
Figure 4:
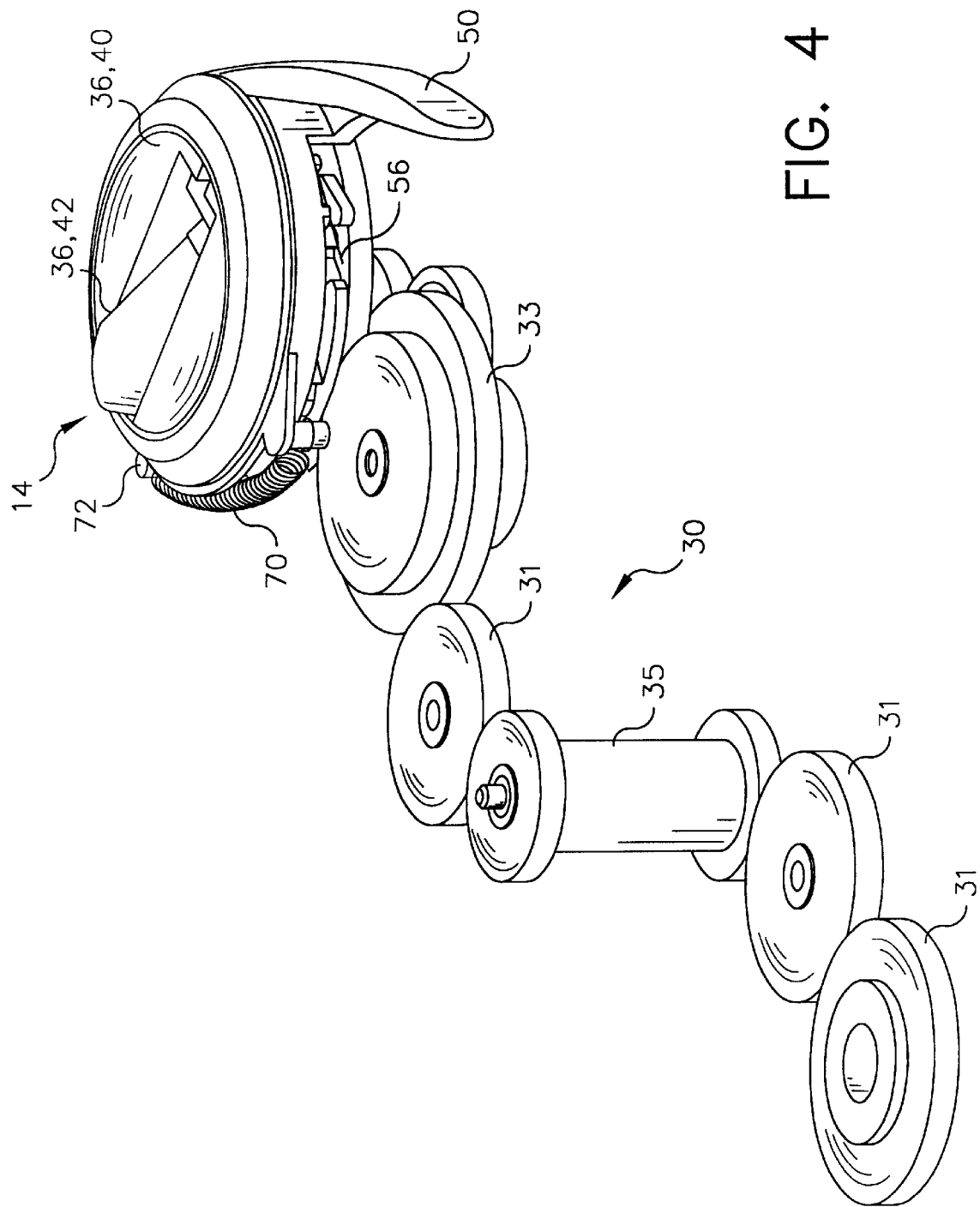
FIG. 4 is a semi-diagrammatical rear perspective view of the advance-rewind unit and film drive of the camera of FIG. 3.
Figure 5:
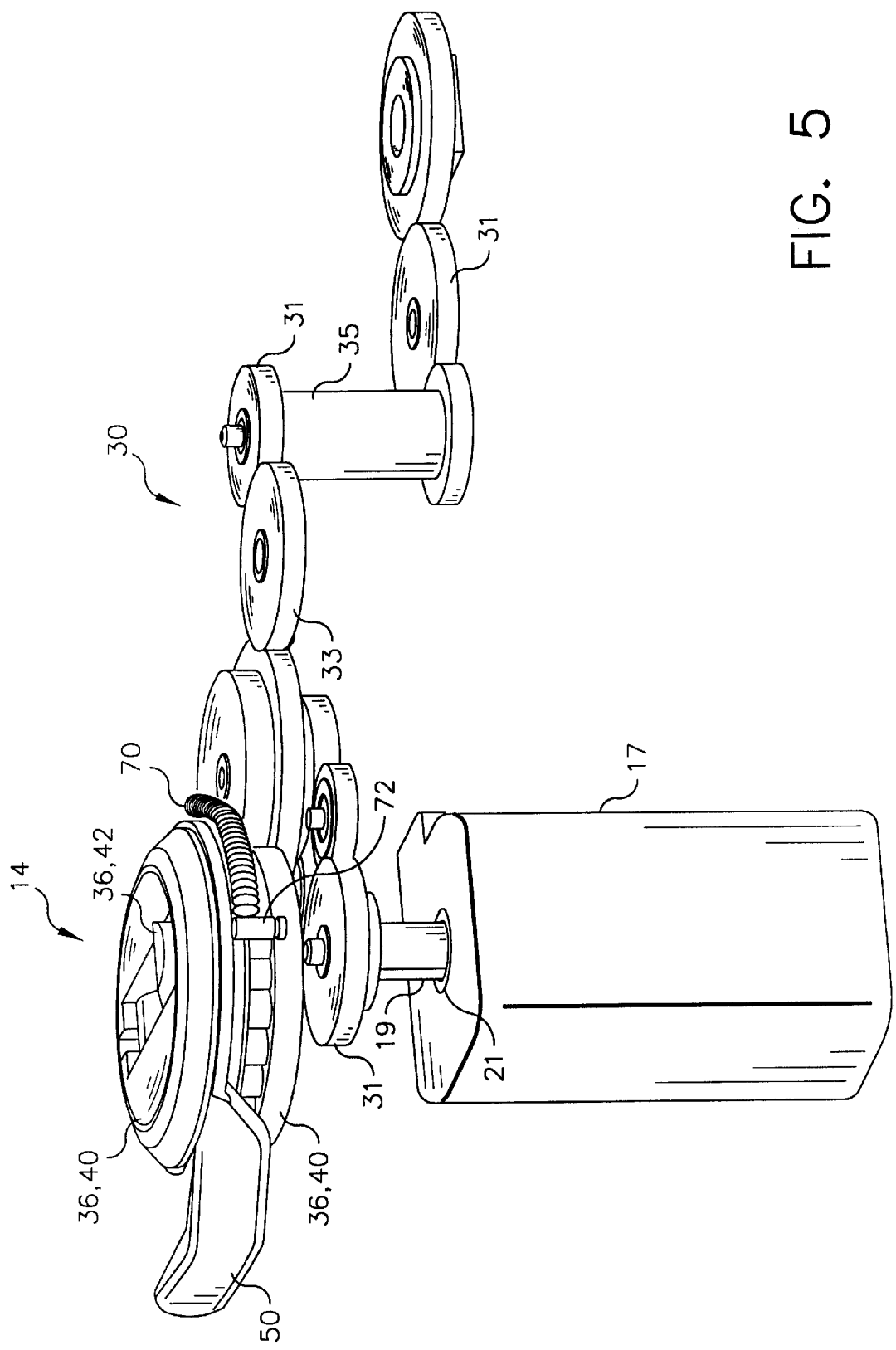
FIG. 5 is a semi-diagrammatical front perspective view of the advance-rewind unit and film drive of FIG. 4. A film magazine is also illustrated operatively connected to the film drive.
Figure 6:
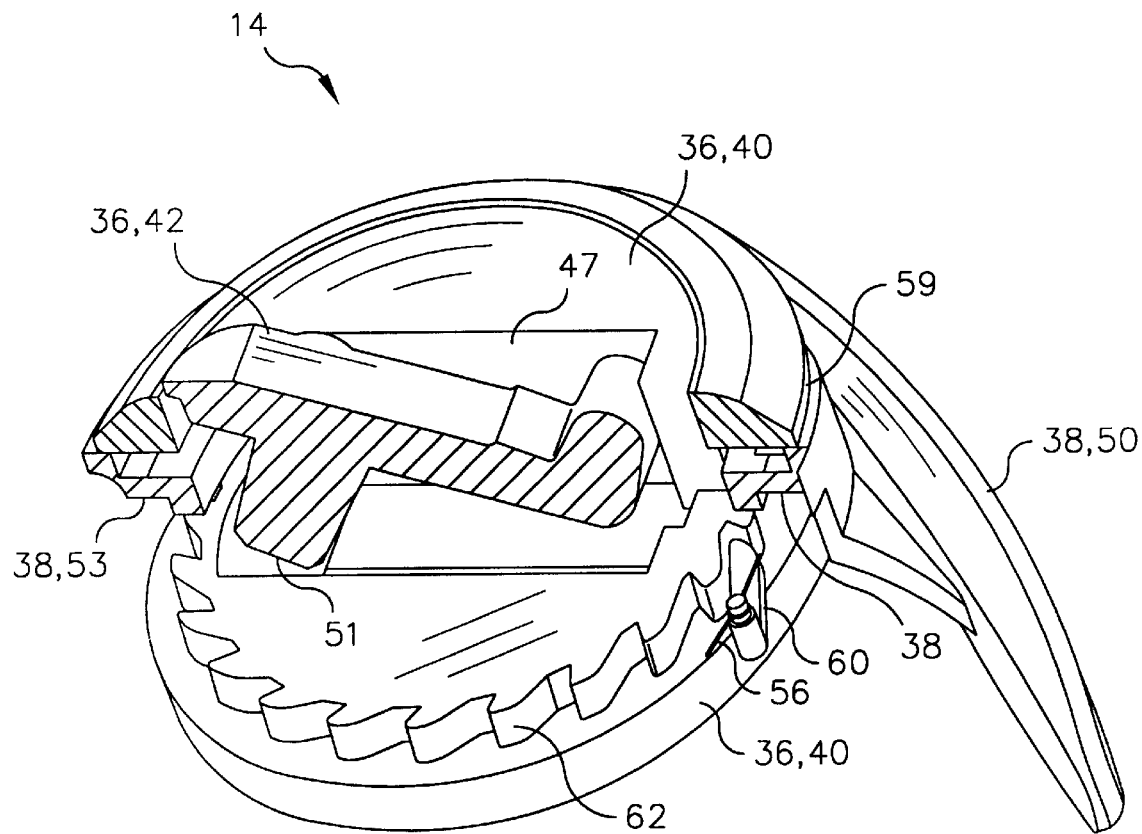
FIG. 6 is a partially cut-away perspective view of the advance-rewind unit of FIG. 3.
Figure 7:
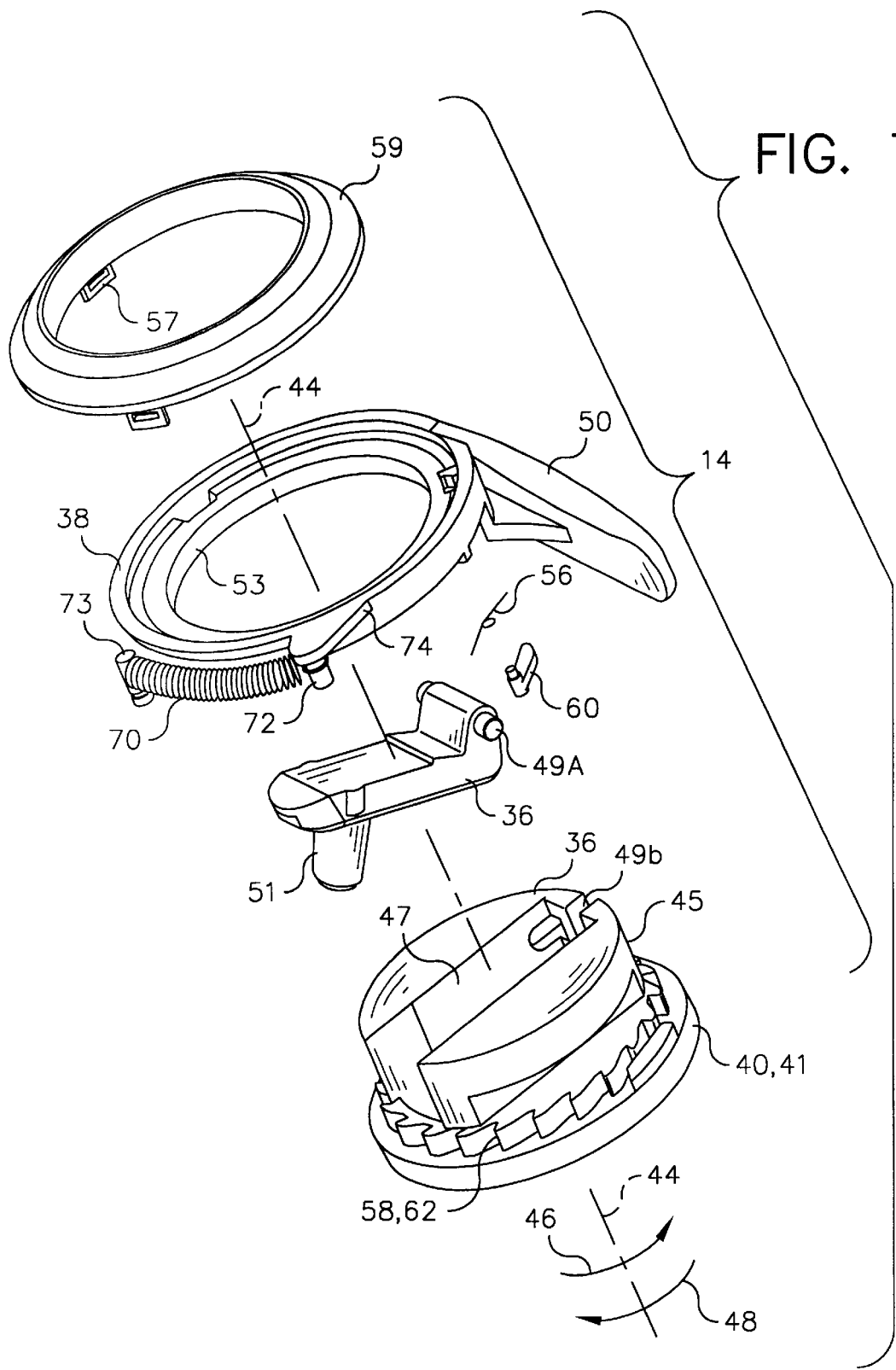
FIG. 7 is an exploded view of the advance-rewind unit of FIG. 3.

A film winder or winding element 38 is mounted to the body 12. The film winder 38 is pivotable in first and second opposite directions (indicated in FIG. 2 by arrows 123,125) relative to the body 12 through an arc of less than a full circle. A crank or winding element 36 is mounted to the body 12. The crank 36 has a handle 42. The crank 36 is rotatable, relative to the body 12 through a full circle in forward and reverse directions of rotation (indicated in FIG. 2 by arrows 127,129). The movement of the film winder 38 is generally described herein as "pivoting". The movement of the crank 36 is generally described herein as "rotation". It will be understood that each of these terms are inclusive of pivotal or rotary motion through a full circle. The term "pivoting" is also inclusive of pivotal or rotary motion through less than a full circle. The film winder 38 can be limited to pivoting through an arc of less than a full circle. For example, the film winder 38 can have a grip portion 50 (shown in FIG. 3) that is an advance lever mounted for rotation through a limited arc about (180–240 degrees). The film winder 38 can also be configured for rotation through a complete circle. For example, the film winder 38 shown in FIGS. 1–2, has a grip portion 50 that is a thumbwheel and is rotatable through 360 degrees. Despite being continuously rotatable, the thumbwheel is most conveniently used by the operator stroking the wheel with a thumb. The thumbwheel is heavily knurled to prevent slippage of the operator's thumb.

Each winding element 36,38 is at least partially accessible by the operator from outside the camera body 12. The winding elements 36,38 are described in the following in terms of an embodiment in which the first direction of rotation advances film and the film is rewound after all film has been advanced and exposed. The invention is equally applicable to a camera in which film is prewound before exposure and then wound back into the film canister.

The film winder 38 is connected to the film drive 30 by a ratchet and pawl mechanism 131. The ratchet and pawl mechanism 131 mechanically engages the film winder 38 with the film drive 30 in the first direction of pivoting of the film winder 38 relative to the film drive 30 and camera 10. The ratchet and pawl mechanism 131 mechanically disengages the film winder 38 from the film drive 30 in a second direction of pivoting of the film winder 38 relative to the film drive 30 and camera 10. The crank 36 is meshed with or fixed to a gear 31 or in other positive engagement with the film drive 30. Thus, the crank 36 is in constant engagement with the film drive 30 and rotates whenever the film drive moves. Film advance can thus be provided by pivoting of the film winder 38, or rotation of the crank 36. Reverse rotation of the film winder 38 is ineffective, due to the ratchet and pawl mechanism 131. Reverse rotation of the crank 36 is prevented, except during rewinding, by an anti-backup 122 acting on the film drive 30. It is preferred that the ratchet and pawl mechanism be the overrunning type, since this allows the film winder 38 to be still while the crank 36 is rotated in the advance direction. A suitable ratchet and pawl mechanism 131 of this type is discussed below in relation to a particular embodiment of the invention.

In the embodiment of the invention shown in FIG. 1 in solid lines, the film winder 38 and crank 38 are each disposed closer to said cartridge chamber than to said supply chamber. This makes access by the operator to film advance features easier, since the other portion of the camera can be continuously gripped while both the film winder 38 and crank 36 are used. The film advance and crank are coaxial. This reduces space to some extent.

In an embodiment of the method of the invention, the camera 10 is loaded with a thrust type cartridge 17 and the cartidge spool 103 is mechanically coupled to the crank 36 and through the ratchet and pawl mechanism 131 to the film winder 38. The crank 36 is rotated in a circular motion in the first direction of rotation, preferably independent of the film winder, to advance the leading portion of the filmstrip from the cartridge. The filmstrip is then cinched and the film winder 38 is pivoted to advance the main portion of the filmstrip from the cartridge on a frame-by-frame basis for exposure. The pivoting is within an arc smaller than a full circle. After exposures are completed, the crank is rotated, preferably independent of the film winder, in a second direction of rotation opposite the first direction of rotation, to rewind the leading and main portions of the filmstrip. In the embodiment just described the camera 10 is not adapted to prewind the filmstrip. In a prewinding, that is, initial rewinding, embodiment, the crank is first rotated, preferably independent of the film winder, in the second direction of rotation opposite the first direction of rotation, to rewind and cinch the leading portion and then rewind the main portion of the filmstrip. The film winder 38 is pivoted in the first direction of rotation, to advance the main portion of the filmstrip from the cartridge on a frame-by-frame basis for exposure. After exposure of the last frame, the crank 36 is rotated in a circular motion in the first direction of rotation, preferably independent of the film winder, to advance the leading portion of the filmstrip toward and back into the cartridge.

Referring now specifically to additional features of an embodiment of the invention illustrated in FIGS. 3–11, the crank 36 and film winder 38 are brought together in an advance-rewind 14. The crank 36 includes a base or gear unit 40 and a handle 42. The gear unit 40 is meshed with or fixed to a gear or in other positive engagement with the film drive 30. The handle 42 is joined to the gear unit 40 and is preferably pivotable relative to the gear unit 40 between a use position (shown in FIG. 3) and stored position (shown in FIG. 4). In the use position, the handle 42 extends outward from the gear unit 40. In the stored position, the handle 42 is at least partially recessed within the gear unit 40. The crank has a gear portion 41, and a cap portion 45 above the gear portion 41. The cap portion 45 has a socket 47. The handle 42 is elongate and has a hinge portion 49a, at one end, trapped by and pivotable within a complementary shaped hinge portion 49b of the socket 47. The handle 42 has a knob 51 at the other end. The knob faces inward when the handle 42 is in the stored position and faces outward when the handle 42 is in the use position.

The film winder 38 is coaxial with and, preferably, adjoins and encircles the crank 36. The film winder 38 has a grip portion 50 which is configured as a thumbwheel or advance lever or the like. The film winder 38 has a ring portion 53 that is continuous with the grip portion 50. The ring portion 53 encircles the cap portion 45 of the crank and overlies the gear portion 41. The ring portion 53 can be configured to receive clips 57 or other attachment features of a holder 59 that overlies at least a part of the ring portion 53. The holder 59 engages a feature (not separately indicated) of the crank 36 and retains the film winder 38 and crank 36 together.

The crank 36 and film winder 38 each define a common winding axis 44 and are each rotatable about the winding axis 44 in opposed first and second directions of rotation (indicated by arrows 46,48 in FIGS. 3 and 7) relative to the body 12 or other fixed point.

The advance-rewind 14 has a one-way, overrunning clutch 52 between the crank 36 and the film winder 38. The clutch 52 is selectively switchable between active and released states. When the clutch 52 is in the active state and the film winder 38 is rotated in the first direction, the film winder 38 is coupled to the crank 36 and both rotate. When the clutch 52 is in the active state and the crank 36 is rotated in the first direction, the film winder 38 is decoupled from the crank 36 and only the crank 36 rotates. Rotation of the crank 36 in the second direction is precluded when the clutch 52 is in the active state. Thus when the clutch 52 is in the active state, film can be advanced by winding the crank 36 or ratcheting the film winder 38 or by some combination of the two, but film cannot be rewound. In the released state, the clutch 52 permits rotation of said crank 36 relative to the body 12 in the second direction of rotation. The film winder 38 is preferably decoupled from the crank 36 either when the clutch 52 enters the released state or after rotation of the film winder 38 to a rest position.

The advance-rewind 14 has a switch member 54 disposed in operative relation to the clutch 52 to switch the clutch 52 between the active and released states. The advance-rewind 14 preferably includes a resilient member or spring 56 that biases the switch member 54 to a first position, in which the clutch 52 is in the active state. The switch member 54 is movable to a second position to change the clutch 52 to the released state. The switch member 54 can be directly or indirectly actuable by the operator to change the state of the clutch 52. The switch member 54 can also instead automatically change the clutch 52 to the released state each time one of the winding elements 36,38 assumes a rest position. In this case, a anti-backup 122 acting directly on the film drive 30 or the like, is necessary to prevent inadvertent rewinding.

The advance-rewind preferably has a clutch 52 that includes a ratchet or ratchet gear 58 and a pawl 60. The ratchet gear 58 is joined in fixed relation to one of winding elements 36 or 38. The pawl 60 is joined to the other winding element 38 or 36. The ratchet gear 58 has teeth 62 and the pawl 60 is biased toward the teeth 62. The switch member 54 is actuable to prevent the pawl 60 from engaging the teeth 62. The ratchet gear is continuous with the cap portion 45 of the crank 36 and pawl 60 is pivotably mounted to the film winder 38 and is biased by a spring 56 toward the teeth 62 of the ratchet gear 58, which is part of the base 40 of the crank 36. The spring 56 bears against the pawl 60 and a pin 64 (not shown in all the figures). The pin 64 is fixed to the rim 66 of the wining element 38.

The switch member includes a ramp 55. The ramp 55 can be permanently fixed to the rim 66 of the film winder 38 in a position extending into the path of the pawl 60 during pivoting. In this case, every time the film winder 38 pivots to a rest position, the pawl 60 engages the ramp 54 and is pivoted about pin 68 away from the teeth 62 of the ratchet gear 58. The rest position is a relative angular relation of the first and second winding elements 36,38 in which the pawl (indicated in FIG. 7 by dashed line 60a) is pushed outward. In use, film is advanced by an operator rotating the crank 36 or film winder 38 and crank 36 in the first direction of rotation. At the completion of film exposure, the operator places the film winder 38 in the rest position to switch the clutch 52 into the rewind state and deactivates a separate anti-backup 122 (not illustrated). Film can then be rewound by rotating the crank 36 in the second direction of rotation. A resilient member 56, such as a coil spring 70, can be attached to posts 72,73 on the winding elements 36,38 to bias the film winder 38 toward the rest position. Post 72 is mounted to a flange 74 that extends radially outward from the ring portion 53 of the film winder 38. Post 73 is fixed to the body 12.

The switch member 54 can also be mounted for radial movement relative to the crank 36. For example, the switch member 54 can include a ramp 55, a shaft 74 which extends through a hole in the rim 66 of the film winder 38, and a button 76 fixed to the shaft 74 opposite the ramp 55. The shaft 74 can be slidably movable in the hole, in the directions indicated by double-headed arrow 78, between a use position (shown in FIG. 9) and a non-use position (not illustrated) outboard from the use position and the path of the pawl 60 during pivoting. The switch member 54 can be biased outward into the non-use position, by a compression spring (not illustrated). With this switch member 54, the pawl 60 engages the ramp 55 and is pivoted about a pin 68 away from the teeth 62 of the ratchet gear 58 only when the the ramp 55 is pushed inward into the use position. This can be done directly by the operator or can be accomplished indirectly through motion of another part (not shown). This switch member 54 can take the place of a separate anti-backup 122 or can be configured to operate in tandem with a separate anti-backup 122. Film is advanced by the operator rotating the crank 36 or film winder 38 and crank 36 in the first direction of rotation. At the completion of film exposure the operator holds the switch member 54 in place to overcome the biasing of the resilient member 56 and change the clutch 52 into the rewind state. Film can then be rewound by rotating the crank 36 in the second direction of rotation.

The advance-rewind 14 can be very compact in a direction parallel to the winding axis 44. The crank 36, film winder 38, and clutch 52 are aligned along the winding axis 44 such that at least one geometric plane (indicated in FIG. 8 by item 80) perpendicular to the winding axis 44 extends through the crank 36, the film winder 38 and the clutch 52. Referring again particularly to FIG. 8, the crank 36 has a handle 42 that is folded into the base 40 such that the winding elements 36,38 have about the same dimension in a direction parallel to the axis of rotation, when the handle 42 is in the stored position.

Figure 8:
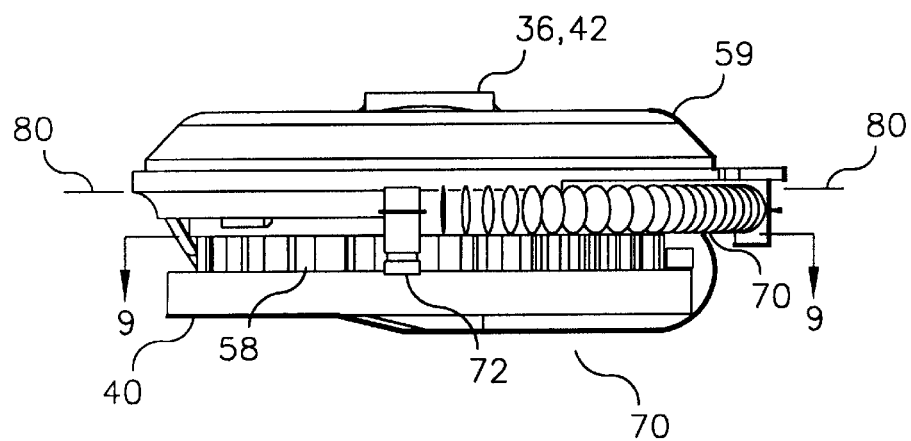
FIG. 8 is a side plan view of the advance-rewind unit of FIG. 3.
Figure 9:
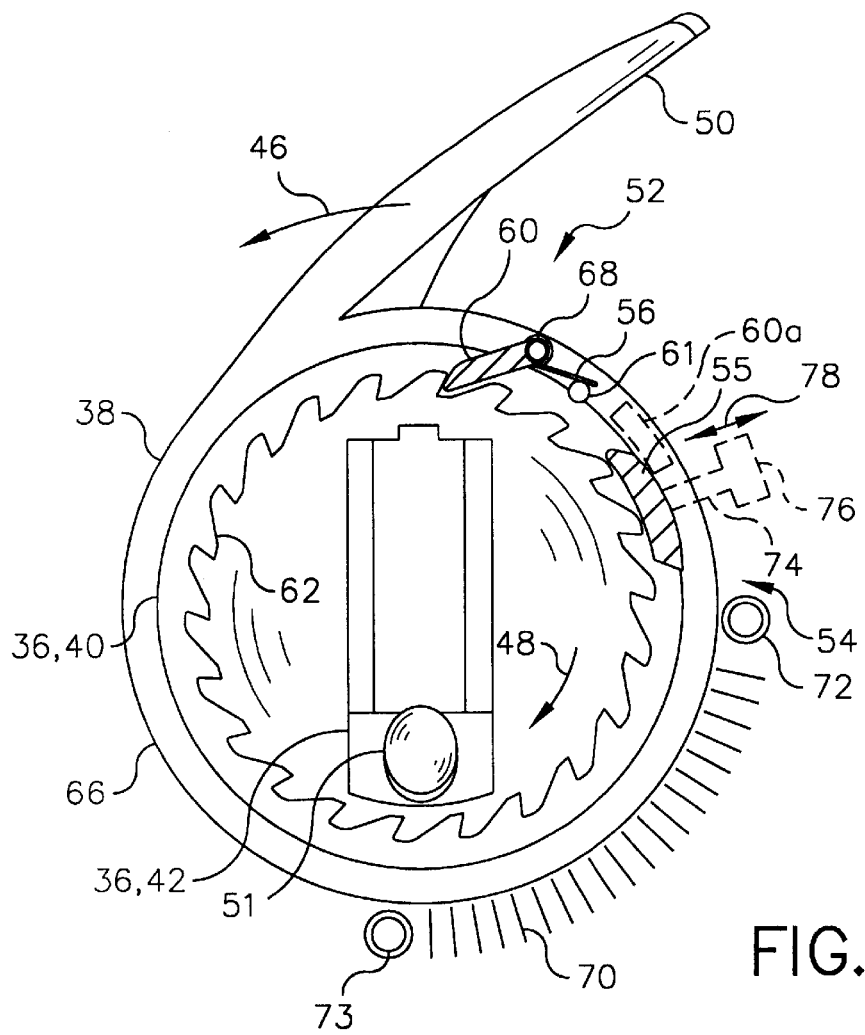
FIG. 9 is a cross-sectional view of the advance-rewind unit of FIG. 8, taken substantially along line 9—9.
Figure 10:
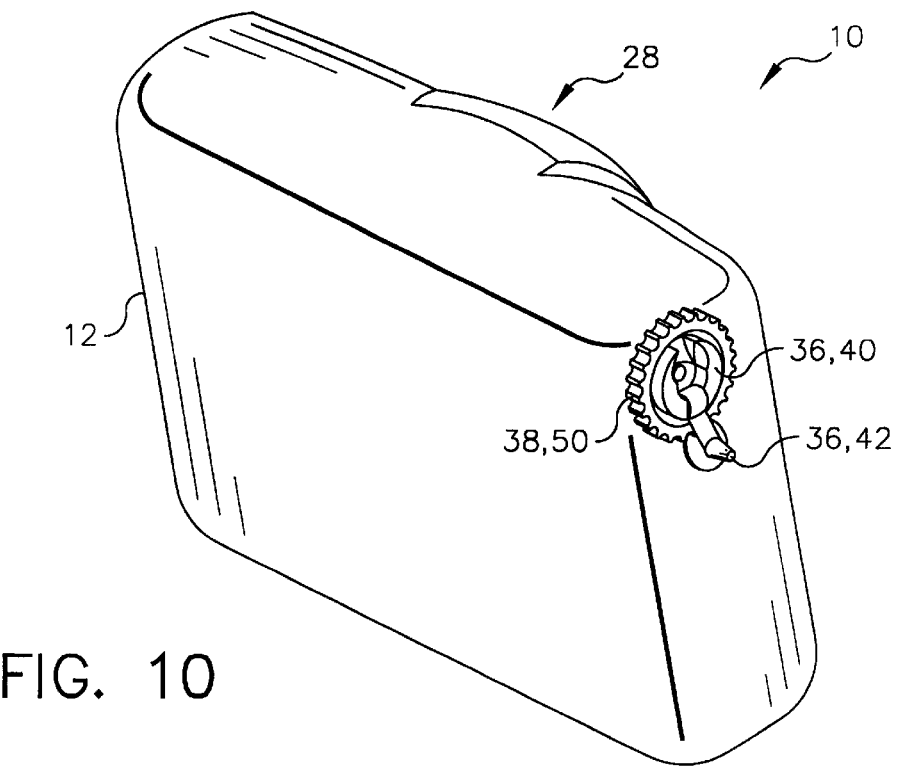
FIG. 10 is a rear perspective view of still another embodiment of the camera of the invention. In this embodiment, the advance-rewind unit of the invention is vertical and the film winder is a thumb wheel.
Figure 11:
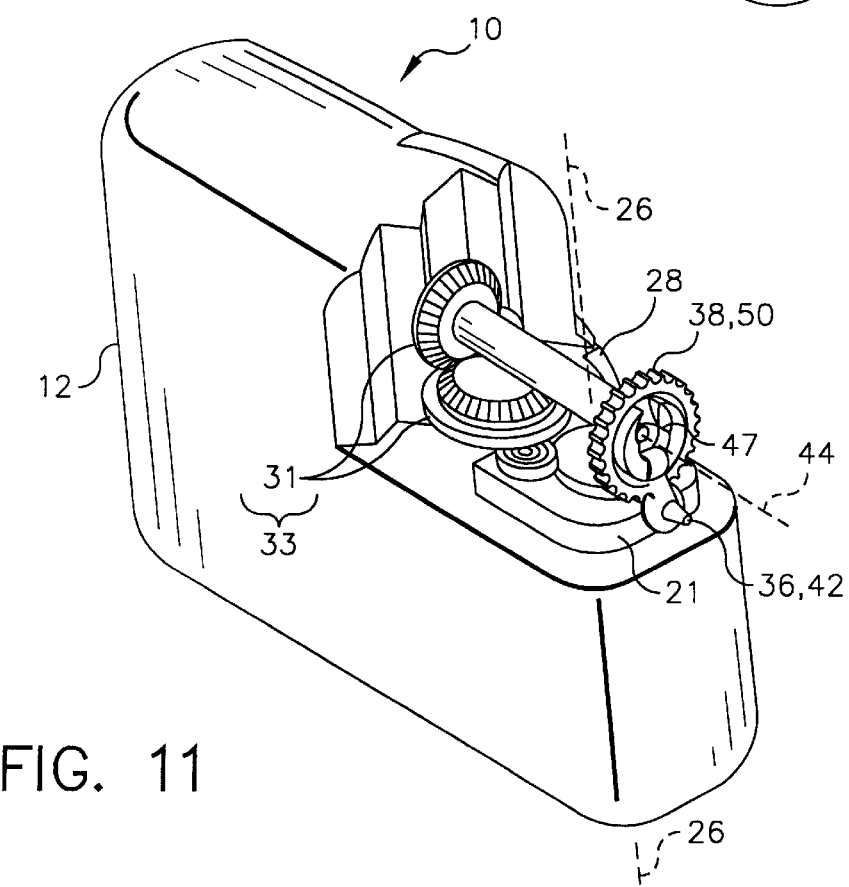
FIG. 11 is a partially cut-away rear perspective view of the camera of FIG. 10 showing the advance-rewind unit, part of the film drive, and a film canister engaged by the film drive.

The compact dimension of the advance-rewind 14 in a direction parallel to the winding axis 44 allows placement of the advance-rewind 14 in locations on the camera 10 in which the winding axis 44 is not coextensive with one of the film space axes 26. The advance-rewind 14 can be positioned such that the winding axis 44 is noncollinear with either of the film space axes 26 along an imaginary plane 81 defined by said film space axes 26 (see FIG. 9), or can be offset from that plane, slightly or so far that the winding axis 44 is exterior to the film chambers 16,18. The latter is shown in FIG. 8, in which the advance-rewind 14 is positioned at a corner of the camera 10. A gear train or other film drive 30 can be included to also shift the winding axis 44 ninety degrees to the film space axes, as shown in FIGS. 10–11.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

PARTS LIST camera 10
body 12
advance-rewind 14
first film chamber or cartridge chamber 16
cartridge 17
second film chamber or supply chamber 18
spindle 19
exposure frame 20
cartridge 21
film path 22
film space 24
film space axis 26
film exposure system 28
film drive 30
gears 31
engagement element 32
gear train 33
metering mechanism 34
first winding element or crank 36
second winding element or film winder 38
base or gear unit 40
gear portion 41
handle 42
winding axis 44
cap portion 45
arrow (indicates first direction of rotation) 46
socket 47
arrow (indicates second direction of rotation) 48
grip portion 50
knob 51
clutch 52
ring portion 53
switch member 54
ramp 55
resilient member 56
clips 57
ratchet or ratchet gear 58
pawl 60
teeth 62
pin 64
rim 66
pin 68
coil spring 70
posts 72,73
shaft 74
button 76
double-headed arrow 78
plane 80
filmstrip 101
internal spool 103
leading portion 105
main portion 106
sprocket holes 107
supply spool 109
supply spool axis 111
cincher 113
plate 115
supply chamber wall 117
spring 119
rollers 121
arrows 123,125,127,129
ratchet and pawl mechanism 131

What is claimed is:

1. A camera for use with a thrust type cartridge having a spool and a photographic filmstrip, said camera comprising:

a body defining a cartridge chamber and a supply chamber and an exposure frame between said chambers, said cartridge chamber being adapted to receive the film cartridge;

a spindle disposed in said cartridge chamber to engage the cartridge spool;

a supply spool disposed in said supply chamber, said spool being rotatable about a supply spool axis;

a cincher disposed in said supply chamber to cinch said filmstrip to said spool;

a film drive in engagement with said supply spool and said spindle to rotate said supply spool and said spindle in opposed advance and rewind directions of rotation;

a film winder mounted to said body, said film winder being pivotable in first and second opposite directions relative to said body through an arc of less than a full circle;

a ratchet and pawl mechanism connecting said film winder to said film drive, said ratchet and pawl mechanism being mechanically engaged with said film drive in said first direction of pivoting of said film winder relative to said film drive, said ratchet and pawl mechanism being mechanically disengaged from said film drive in a second direction of pivoting of said film winder relative to said film drive;

a crank mounted to said body, said crank being rotatable, relative to said body through a full circle in forward and reverse directions of rotation, said crank being engageable with said film drive in both said directions of rotation.

2. The camera of claim 1 wherein said crank is in constant engagement with said film drive.

3. The camera of claim 2 further comprising an anti-backup changeable between an advance condition and a rewind conditon, said anti-backup in said advance condition precluding said crank from rotation in said reverse direction.

4. The camera of claim 1 further comprising an anti-backup changeable between an advance condition and a rewind conditon, said anti-backup in said advance condition precluding said film drive from rotating said supply spool and said spindle in said rewind direction of rotation.

5. The camera of claim 1 wherein said film advance and said crank are coaxial.

6. The camera of claim 5 wherein said film advance and said crank are each disposed closer to said cartridge chamber than to said supply chamber.

7. The camera of claim 1 wherein said film advance and said crank are each disposed closer to said cartridge chamber than to said supply chamber.

8. The camera of claim 1 wherein said filmstrip has an unperforated leading portion and a main portion having sprocket holes and said film drive meters against said sprocket holes.

9. A method for transporting film in a camera using a thrust type cartridge having a spool and a photographic filmstrip, said filmstrip having a leading portion and a main portion, said method comprising the steps of:

loading a thrust type cartridge in the camera;

mechanically coupling the spool of the cartridge to a crank and to a film winder;

rotating said crank in a first direction of rotation, to advance said leading portion of the filmstrip; and pivoting said film winder to advance the main portion of the filmstrip.

10. The method of claim 9 further comprising prior to said pivoting step, cinching the filmstrip to a second spool.

11. The method of claim 9 wherein said crank is rotated independent of said film winder.

12. The method of claim 9 wherein said rotating step further comprises rotating said crank through at least full circle.

13. The method of claim 12 wherein said pivoting step further comprises pivoting said crank within an arc smaller than a full circle.

14. The method of claim 9 further comprising following said pivoting step, rotating said crank, independent of said film winder, in a second direction of rotation opposite said first direction of rotation, to rewind said leading and main portions of the filmstrip.

15. The method of claim 9 wherein said rotating said crank in a first direction of rotation advances said leading portion of the filmstrip from said cartridge; and said pivoting step advances the main portion of the filmstrip from said cartridge.

16. The method of claim 9 wherein said rotating said crank in a first direction of rotation advances said leading portion of the filmstrip toward said cartridge; and said pivoting step advances the main portion of the filmstrip toward said cartridge.

17. The method of claim 9 further comprising prior to said pivoting step, rotating said crank, independent of said film winder, in a second direction of rotation opposite said first direction of rotation, to prewind said leading and main portions of the filmstrip; and wherein said rotating step follows said pivoting step.

* * * * *